Figure 3:
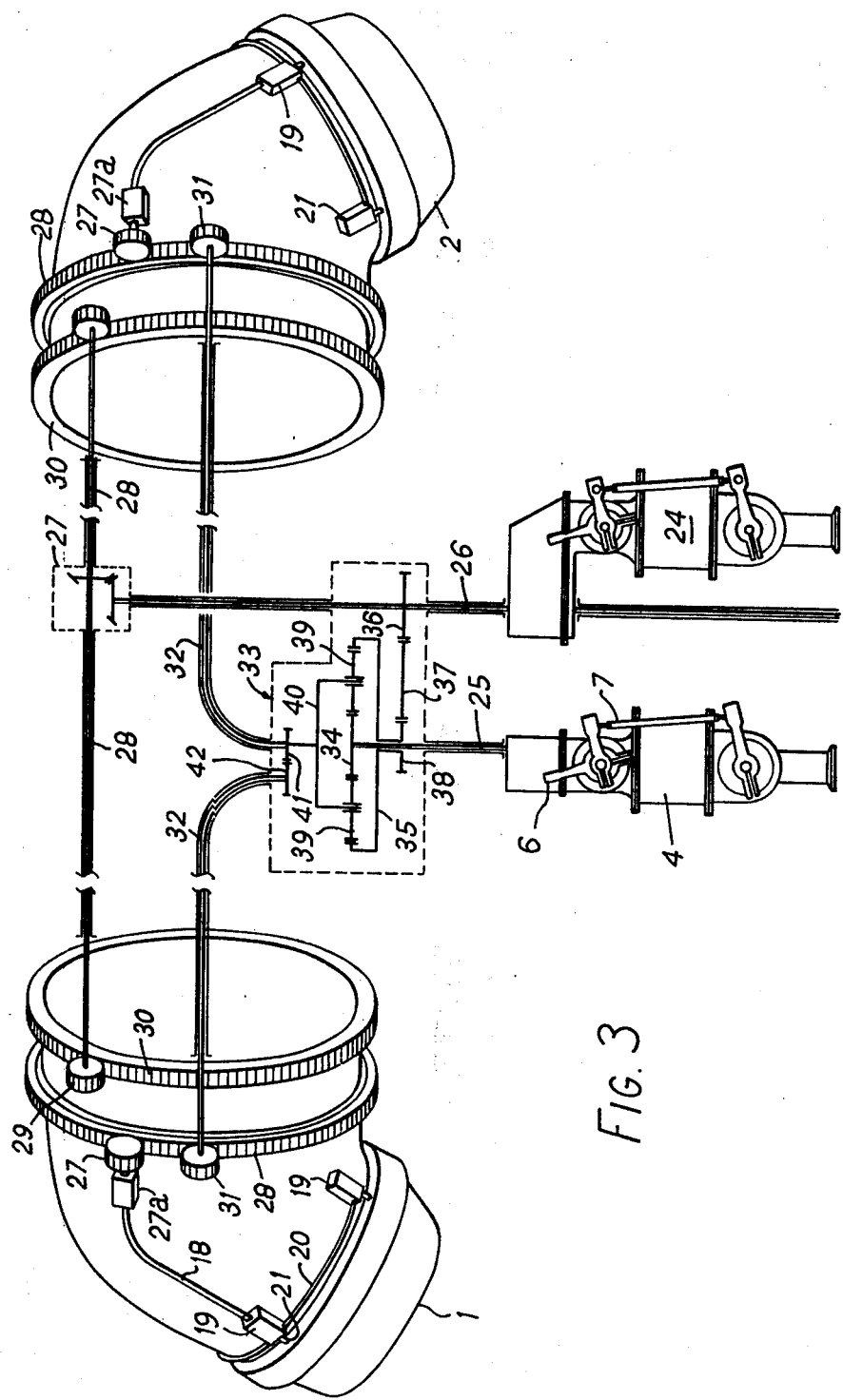

United States Patent [19]

Skinner et al.

[11] 4,132,089
[45] Jan. 2, 1979

[54] TRANSMISSION OF MOVEMENT TO A UNIT MOUNTED ON A ROTATABLE CARRIER

[75] Inventors: Alexander Skinner, Southampton; Ronald G. T. Cook, Fareham, both of England

[73] Assignee: Plessey Handel und Investments AG, Zug, Switzerland

[21] Appl. No.: 693,860

[22] Filed: Jun. 8, 1976

[30] Foreign Application Priority Data

Jan. 10, 1976 [GB] United Kingdom .................. 908/76

[51] Int. Cl.$^2$ .............................................. F16C 1/02
[52] U.S. Cl. ................................... 64/2 R; 244/23 D; 244/52; 74/108
[58] Field of Search ............ 285/272; 244/76 J, 23 D, 244/52, 169; 74/108, 501 R

[56] References Cited

U.S. PATENT DOCUMENTS

| | | | |
|---|---|---|---|
| 1,812,510 | 6/1931 | Berge | 64/2 R |
| 2,377,271 | 5/1945 | Schumann | 64/2 R |
| 2,586,360 | 2/1952 | Mall | 64/2 R |
| 3,117,750 | 1/1964 | Shell | 244/52 |
| 3,455,111 | 7/1969 | Allcock | 244/52 |

FOREIGN PATENT DOCUMENTS

679229 12/1964 Italy ............................................ 244/52

Primary Examiner—Samuel Scott
Assistant Examiner—Gerald A. Anderson
Attorney, Agent, or Firm—Fleit & Jacobson

[57] ABSTRACT

In order to drive a unit mounted on a carrier rotatable about an axis, the drive for the unit is transmitted from a unit actuator to the unit-drive mechanism on the carrier by a shaft-driven member so arranged that its rotation relative to the carrier is unaffected by rotation of the carrier itself. In one alternative this is achieved by transmitting the output of the unit actuator through a flexible shaft which enters the carrier tangentially and is guided in the fixed structure for its adjacent end to project in a direction normal to the axis of rotation of the carrier, and in an alternative arrangement rotation transmitted to the carrier actuator is superimposed, by means of a differential gear drive arrangement, one gear of which is geared to the output shaft of the carrier drive actuator, upon the rotation of the pinion transmitting, to a ring gear coaxially rotatable about the carrier, the movement of the unit drive servomotor output shaft.

8 Claims, 5 Drawing Figures

FIG. 2

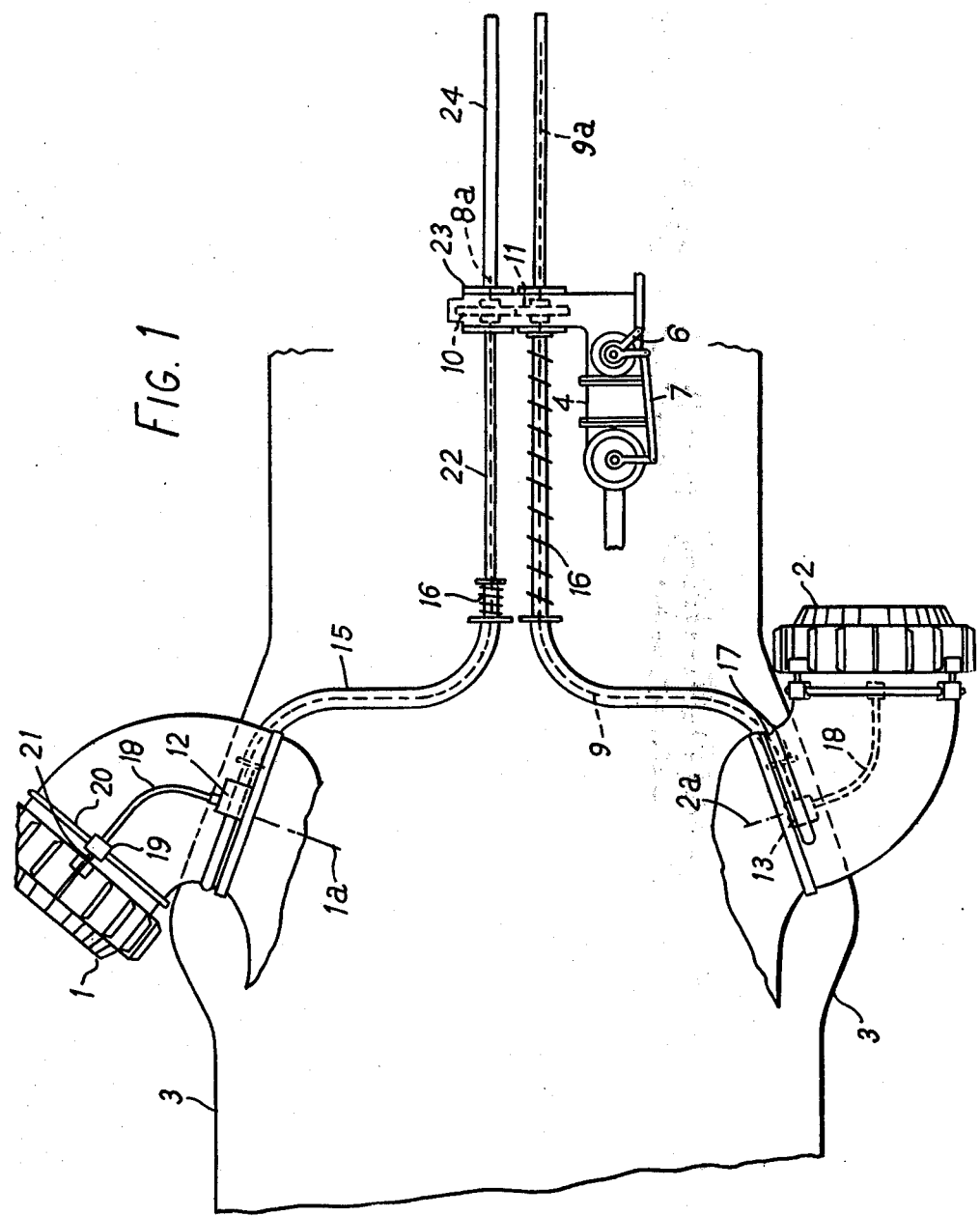

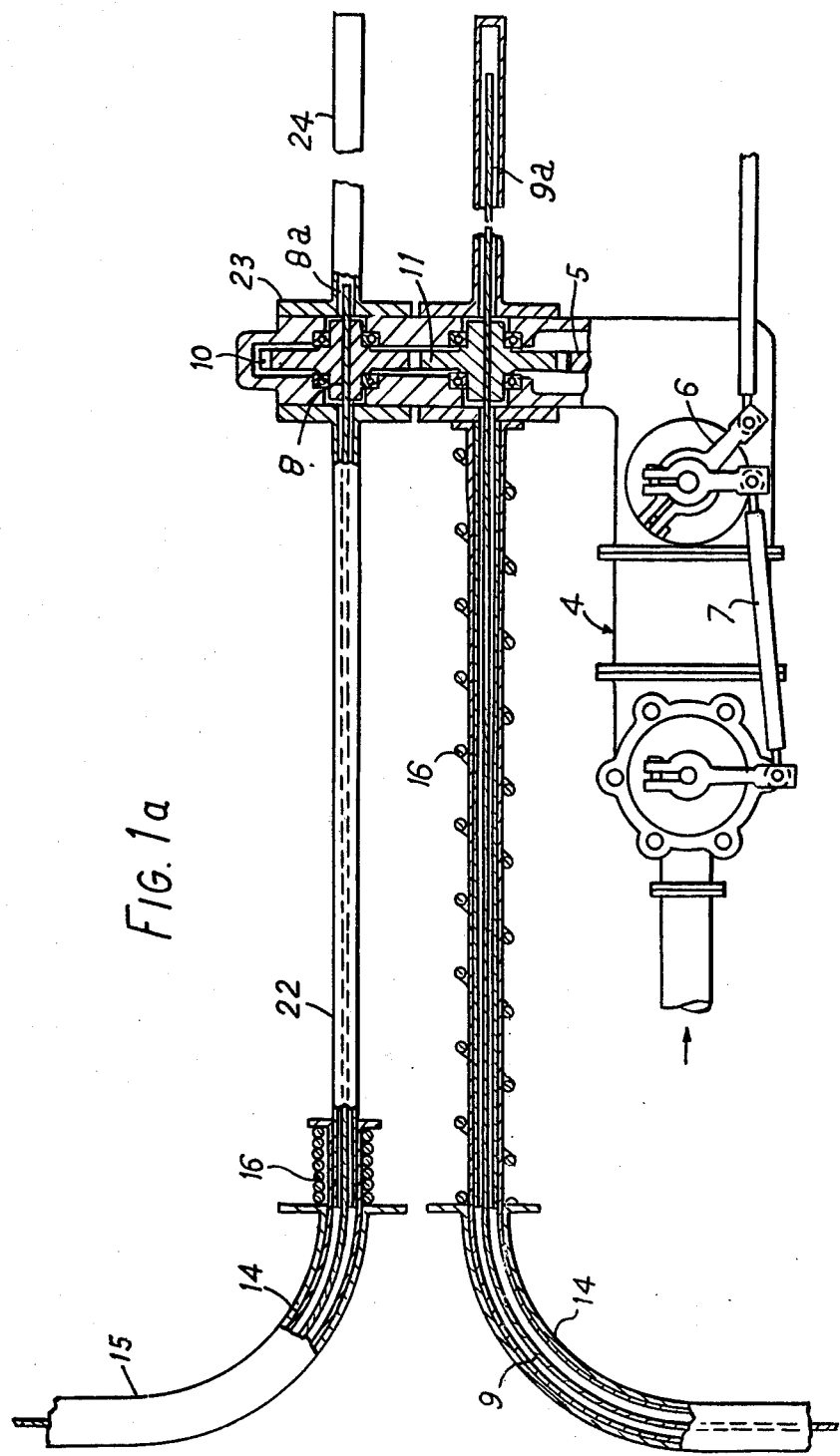

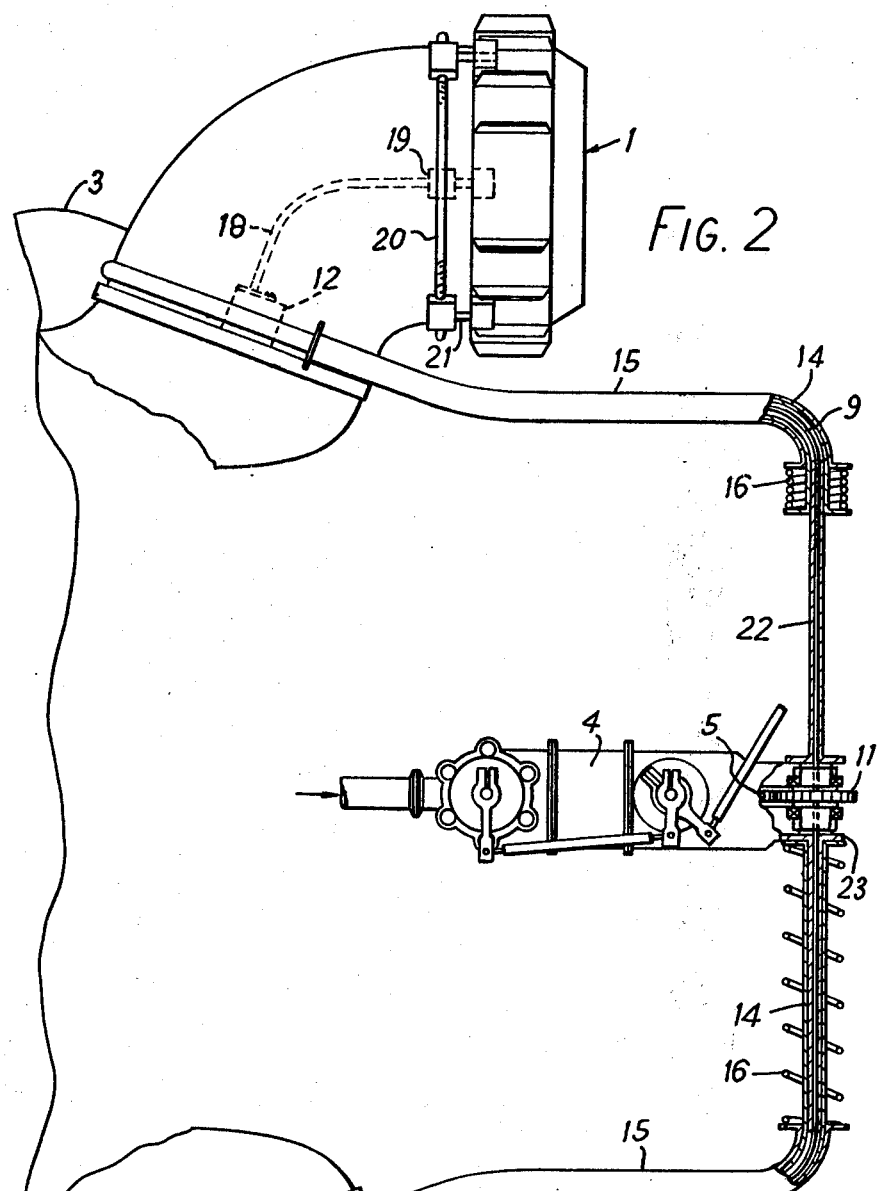
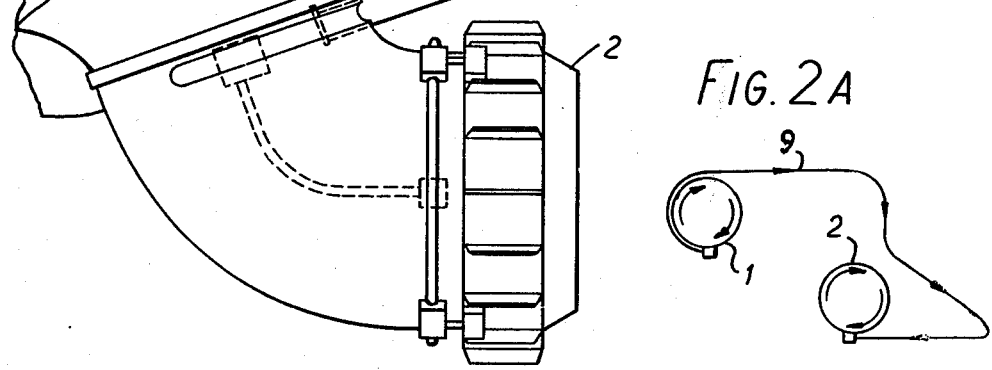

TRANSMISSION OF MOVEMENT TO A UNIT MOUNTED ON A ROTATABLE CARRIER

This invention relates to the transmission of rotary movement from a fixedly mounted unit-actuator to a unit which is mounted on a carrier which is rotatably movable relative to this fixed mounting about an axis, hereinafter called swivel axis. It is frequently required in this case to transmit the rotary movement of the rotary output element of the actuator in such a manner to the unit which is mounted on the carrier that the amount of movement transmitted to the carrier-mounted unit relative to the carrier is determined only by the amount of movement of the output element of the unit actuator and is independent of any rotary movement of the carrier; the carrier itself will as a rule be coupled to the output element of a second actuator, hereinafter called carrier-drive actuator, for proportional rotation therewith. One important use of such an arrangement is for the actuation of a nozzle-area control device in variable-direction jet nozzles, also known as vectorised-thrust nozzles. Such nozzles are, for so-called thrust-vectoring purposes, rotatable about an axis that forms an angle with the axis of the nozzle outlet and it is generally necessary for the unit-actuator output movement to be transmitted to the rotatable nozzle body at a point outside the cross-section of the nozzle. Other possible uses of an arrangement of the indicated kind are for example, for the transmission of movement to elements mounted in rotating parts of a machine tool or of agricultural equipment. If the unit-actuator is of the follow-up type having feedback means which terminate the operation of the actuator when the amount of output movement achieved corresponds to the input signal represented by a displacement of an input element, the desired transmission of rotary movement could be achieved by transmitting the drive from the unit actuator to the carrier-mounted unit via a shaft which enters the carrier in the direction of the carrier-swivel axis, and applying to the input of the unit actuator an error signal which is proportional to the amount of movement of the carrier or its actuator, in such a manner that the error signal is superimposed upon the above-mentioned input signal of the unit actuator. Such an arrangement is however relatively complex, and the present invention has for an object to provide an improved arrangement which achieves the above-indicated kind of transmission without requiring the introduction of such error feedback to the input element of the unit actuator.

The present invention consists in apparatus for the transmission of movement from the rotary output element of a unit actuator forming part of a fixed structure to a unit-drive mechanism mounted on a carrier which itself is rotatable relative to the fixed structure about a swivel axis, wherein movement is transmitted from the output of the unit actuator to the unit on the carrier by a rotatable element whose rate of rotation relative to the carrier is unaffected by any rotation of the carrier about its swivel axis is transmitted to the unit drive on the carrier by a rotary shaft of which at its entry into the carrier, the rotation relative to the carrier is unaffected by any rotation of the carrier about the swivel axis.

In a first form of the invention, the means for transmitting the movement of the rotary output element of the unit actuator to the rotary input element of the unit-drive mechanism include a flexible shaft connected for joint rotation to the output element of the unit actuator and similarly connected to the unit-drive mechanism on the carrier, the carrier being provided with first guide means for the flexible shaft, and the fixed structure being provided with second guide means arranged to guide a portion of the flexible shaft between its connection to the unit-drive actuator and its point of entry into the said first guide means, the first and second guide means being so arranged that the portion of the flexible shaft extending between said first and second guide means enters each of said guide means in a direction perpendicular to the swivel axis of the carrier.

In one embodiment of this form of the invention the guide means are arranged to ensure that the flexible shaft enters the carrier in a tangential direction. Preferably the flexible shaft is so arranged that rotation of the carrier about its axis causes the adjacent portion of the flexible shaft to be wrapped round, or unwrapped from, part of the circumference of the carrier, and a sliding coupling is preferably provided to take-up the variations in the distance between the respective points of connection of the flexible shaft to the carrier and to the output element of the unit actuator.

When a single actuator is intended to drive corresponding units in two carriers for simultaneous rotation about equal angles, the flexible shafts for respective connection to the unit-drive mechanism in each of the two carriers are preferably arranged to be each wound on the respective carrier in such direction that, as one flexible shaft is wound on to its associated carrier, the other flexible shaft is unwound from its carrier by an equal amount, so that the sum of the utilised lengths of the flexible shafts remains constant. A single flexible shaft may therefore be employed which is engaged in a longitudinally slidable manner, by a drive member which itself is driven by the unit actuator and which interconnects the unit drives in the two carriers, but alternatively the unit-drive actuator may be arranged to jointly drive two separate output members, each engaging in a longitudinally slidable manner, a flexible shaft member for the unit drive of one carrier, each flexible shaft extending, beyond the output member driving it, by an amount that is variable according to the angular position of its associated carrier. In each of these alternatives the flexible shaft, or at least at the part of its length which is utilised for driving engagement with the actuator-output member, is of non-circular cross-section, for example square cross-section or spline-shaft cross-section.

In a second form of the invention, the means for transmitting the movement of the rotary output element of the unit actuator to the rotary input element of the unit-drive mechanism on the carrier include a shaft which, at its point of engagement with the carrier, extends axially of the carrier, and which is differentially coupled in such a manner to the respective outputs of the unit-drive actuator and of a carrier-drive actuator that, in addition to the rotation imparted to the said shaft by the unit-drive actuator for producing the desired movement of the unit in relation to the carrier, additional rotation is imparted to it which is proportional to the output of the carrier-drive actuator so as to neutralise any rotary movement of the said shaft relative to the carrier which is due to rotation of the carrier itself.

In order that the invention may be more readily understood three embodiments of the invention as applied to an actuator for varying the nozzle area of so-called vectorised thrust nozzles of an aircraft, which constitute rotatable carriers and are each arranged for rotation about a swivel axis under the control of a carrier-drive actuator, will now be described in more detail with respective reference to the accompanying drawings.

FIG. 1 is a diagrammatic plan view, showing a pair of vectorised-thrust nozzles mounted in an aircraft and equipped with actuating means, embodying the first form of the invention, for the operation of a nozzle-area varying device in each nozzle, FIG. 1A shows part of this arrangement drawn to a larger scale, FIG. 2 similarly illustrates a modified embodiment of the same form of the invention, FIG. 2A is an explanatory diagram, and FIG. 3 illustrates, in a generally similar manner to FIGS. 1 and 2, an embodiment of the second form of the invention.

Referring now first to FIG. 1, a pair of vectorised-thrust nozzles 1 and 2 are respectively arranged at opposite sides of an aircraft indicated by its skin 3. Each nozzle 1 and 2 is rotatable relative to the aircraft about a swivel axis 1a and 2a respectively, which forms an angle to the nozzle axis. The two nozzles are respectively shown in two opposite extreme positions, and they are arranged to be jointly rotatably adjusted for thrust-vectoring purposes by a nozzle-drive actuator, for example in the manner described further below with reference to FIG. 3. A unit-drive actuator 4 is provided for adjustably varying the effective area of each of the two nozzles 1 and 2 and is constructed as an air-motor servo unit. Its output element is a gear 5 which the actuator is arranged to rotate in one direction or the other according to a displacement of an input member 6, and a feedback arrangement 7 is provided to terminate operation of the actuator when the amount of the input movement completed corresponds to the internal displacement of the input member 6. Rotation is transmitted from the gear 5 to two square-section flexible drive shafts 8 and 9 by a pair of gears 10 and 11 driven by the output gear 5 of the actuator 4. Each of these gears has a square-section axial bore by which the shafts 8 and 9 are respectively coupled to the gears 10 and 11 for common rotation therewith while being free to slide in the axial bore in the longitudinal direction of the shaft. In other words, the drive shaft is permitted to slip longitudinally through the square axial bore of the gear but, upon the exertion of any rotational force by either the gear or the shaft, the other element must follow such rotary motion. Each shaft 8 and 9 is connected at one of its ends to a bevel-gear drive in a bevel-gear box 12 and 13 respectively mounted on the associated nozzle body 1 or 2 at the circumference thereof near the rotary connection of this nozzle to the fixed structure of the aircraft. The bevel-gear box may be of the conventional well-known type, which translates rotary motion in a first direction to rotary motion in a second direction. Typically, such bevel-gear boxes may be used to redirect rotary motion at right angles in the X-Y plane. The gear box may be of such simple type having only two bevel-gears which mesh therein, with one of the bevel-gears being affixed to the flexible shaft. Each of these gear boxes is so arranged that the associated flexible shaft enters it with its axis tangential to the nozzle body. In order to ensure reliable transmission of torque and to avoid buckling of the flexible shaft, the latter is, in its portion adjacent to the said gear box, accommodated in a flexible outer sheath 14, which at one end is attached to the housing of the bevel-gear box 12 or 13, and which itself is, for part of its length, accommodated in a guide tube 15, in which it is longitudinally slidable, and which is so fixed in the aircraft that the axis of its end nearest to the bevel-gear box is maintained in a direction perpendicular to the swivel axis of the nozzle and preferably tangential to the nozzle body. A compression spring 16, interposed between that end of the flexible outer sheath 14 which is remote from the gear box 12 or 13 and the adjacent end of the guide tube 15, exerts a longitudinal pull on the flexible outer sheath 14, causing the latter to rest, with its end portion adjacent to the bevel gear box 12 or 13, in a circumferential groove 17 of the nozzle body so that the end portion of the sheath is progressively wrapped round or unwrapped from this groove as the nozzle is rotated in one direction or the other about its swivel axis. It will be readily appreciated that the relative rotational position of each flexible shaft to its associated bevel-gear box 12 or 13 will depend solely on the angular position of its driving gear member 10 or 11, independently of any angular displacements of the respective nozzle about its swivel axis, since such rotational displacement will only vary the length of the sheath 14 which is wound on to, or unwound from, the circumference of the nozzle body but will not produce any angular displacement of the flexible shaft 8 about its axis in relation to the gear box 13 where the shaft enters the latter. Each of the nozzle-carried gear boxes 12 and 13 transmits the rotary displacement of its actuating shaft 8 or 9 via a further flexible shaft 18, a distributor bevel gear box 19, and distributor shafts 20 to a number of screw jacks 21, only one of which is shown in FIG. 1, and which form part of the nozzle-area varying device of each nozzle. The distributor bevel-gear box may also be of the conventional type and is merely used to redirect the rotary motion at right angles to its original direction; this is similar to the operation of bevel-gear boxes, 12 and 13. The screw jacks may be of the standard well-known type. As is well-known, a screw jack simply transforms rotary motion to linear motion and, accordingly, by driving a screw jack by the flexible shaft 20, linear motion may be obtained to adjust the area of the nozzle. The adjacent end of each fixed guide tube 15 is, in the direction of the flexible shaft, spaced from the housing 23 containing the gears 10 and 11 by which the shafts 8 and 9 are driven, sufficiently to allow the flexible outer sheath 14, as it is unwound from the groove 15, to be kept tight by the spring 16 without abutting the said housing, and the part of the length of each flexible shaft 8 and 9 between the end of its guide tube 15 and the said housing 23 is preferably protected by an internal guide tube 22, one end of which is preferably attached to the housing 23, while its other end is arranged to project, inside the flexible outer sheath 14, into the adjacent end of the fixed guide tube 15. A continuation 24 of each guide tube 23 is preferably provided at the opposite side of the housing 23 to accommodate the end portion 8a or 9a of each of the flexible shafts 8 and 9 when the associated nozzle is in the position in which the flexible sheath 14, and with it the fixed end of the associated flexible shaft, is unwound to a greater or smaller extent from the groove 17 in the associated nozzle.

The arrangement illustrated in FIG. 2 is, as regards most of its elements, similar to that illustrated in FIG. 1, and similar reference numbers have been used for designating corresponding parts. It will therefore suffice hereinafter to describe the difference between the two arrangements. In this respect it will be seen that, while in FIG. 1 two separate flexible shafts 8 and 9 are employed to respectively transmit the drive to the two bevel-gear boxes 12 and 13, and the output gear 5 of the actuator 4 is arranged to drive two further gears 10 and 11 for the respective actuation of these two shafts, the arrangement of FIG. 2 makes use of the fact that the two nozzles 1 and 2 are arranged to be rotated simultaneously by equal angles, and that therefore the length of drive shafts and flexible outer sheath wound on to one of the nozzles 1 and 2 is equal to that unwound at the same time from the other nozzle and vice versa, so that the sum of the lengths of drive shaft extending from each bevel gear box 12 and 13 to the drive housing 23 remains constant. This is utilised in the arrangement of FIG. 2 by employing a single flexible shaft 9, which extends from one to the other of the bevel gear boxes 12 and 13, passing on its way through the square section axial bore of the drive wheel 11 which directly engages the output drive gear 5 of the air motor servo unit 4. The further drive gear 10 shown in FIG. 1 is therefore unnecessary and has been omitted in this arrangement. The manner in which the flexible drive shaft 9 is wound on to one of the nozzles 1 and 2 as it is unwound from the other in accordance with what may be called a roll-on, roll-off principle, will be readily ascertained from FIG. 2A.

FIG. 3 illustrates an embodiment of the second form of the invention. In this construction the shaft for transmitting the adjustment movement to the unit drive of each nozzle extends, at its point of engagement with the nozzle, in the direction of the swivel axis of the nozzle, so that rotation of the nozzle about its swivel axis will, when the said shaft is stationary, result in rotary displacement of the shaft in relation to the nozzle and would thus, in the absence of compensatory rotation of the said shaft, produce an undesired variation in the nozzle area. The illustrated embodiment provides improved means which produce such compensatory rotation without requiring any feedback to the input of the actuators respectively provided for the nozzle-thrust vectoring movement and for the area control. The area-control actuator has, as in the other Figures, been indicated by the reference number 4, its output element being a rotary shaft 25, and the nozzle-vectoring actuator has been designated by the reference number 24 and is arranged to drive an output shaft 26. The drive from this latter output shaft 26 is transmitted through bevel gearing in a bevel gear box 27 to a nozzle-rotating shaft 28 which, through pinions 29 at each of its ends, provides rotary displacement of each of the nozzles 1 and 2 in the structure of the aircraft by means of a gear element 30, fixed to the circumference of the nozzle. As in the other embodiments, on each nozzle 1 and 2 a flexible shaft 18 is provided which, through an arrangement of bevel-gear boxes 19 and shafts 20, actuates a number of screw jacks 21 to effect the area variation of the nozzle. In the construction illustrated in FIG. 3, this shaft 18 is driven by a pinion 27 in accordance with rotary displacements, relative to the nozzle and the gear element 30, of a ring gear 28 which is supported by a ball-bearing on the nozzle body so as to be freely rotatable relative to the nozzle about the swivel axis thereof. This ring gear 28 is also engaged by a further pinion 31, whose rotation is determined by the output shaft 32 of a differential gear-drive arrangement to one input of which the rotation of the output shaft 25 of the nozzle-area actuator unit 4 is transmitted to effect any desired variations in the nozzle area while the other input to the differential gear-drive arrangement is provided by the output shaft 26 of the nozzle-vectoring servomotor 24 so that when this servomotor operates, a rotational output proportional to the rotation transmitted by the latter to the nozzle is superimposed upon the rotation transmitted to the ring-gear 28 from the output of the nozzle-area control actuator 4. The differential gear-drive arrangement 33 includes a sun gear 34 drivingly connected to the output shaft 25 of the nozzle-area control actuator 4, an annulus gear 35 driven by the output shaft 26 of the nozzle-vectoring actuator motor 24 via a gear drive 36, 37, 38, and a pair of planet gears 39 which are in engagement with both the sun gear 34 and the annulus gear 35 and are carried by a planet carrier 40. The latter drives the shaft 32 for the pinion 31 of each nozzle, distribution between the two shafts 32, being effected by a pair of intermeshing gears 41, 42.

It will be readily appreciated that when the nozzle-vectoring actuator 24 is at a standstill and accordingly the nozzles 1 and 2 do not rotate about their swivel axes, the drive transmitted to each shaft 32 is proportional to the rotary displacement of the shaft 25 resulting from the operation of the nozzle-area actuator motor 4 to produce the desired area variation of each nozzle, while conversely when the latter actuator 4 is stationary, rotation of the vectoring-actuator output shaft 26 will not only produce rotary displacement of each nozzle by means of the shaft 25 and pinions 29 acting on the tooth ring 30 of the nozzle but will at the same time produce the same amount of rotary displacement in the same direction of the ring gear 28 about the swivel axis of the nozzle, so that the ring gear 28 on the circumference of the nozzle rotates jointly with the nozzle, maintaining its relative angular position unchanged, and since the pinion 27, which drives the shaft 18, is supported by a member 27a which is fixed on the nozzle body, the pinion 27 remains stationary relative to the ring gear 28, so that no movement is transmitted to the screw jacks 21 by the shaft 18. When both actuators 4 and 7 operate simultaneously the two kinds of movement thus explained are superimposed with the result that the movement of the pinion 31 will cause the annulus 28 to be displaced relative to the nozzle about the swivel axis of the latter in accordance with the displacement applied to the output shaft 25 of the nozzle-area adjustment actuator 4 irrespective of any rotary displacement transmitted to the nozzle itself by the nozzle-vectoring actuator unit 24.

The individual embodiments described may be varied in detail without departing from the scope of the invention. Thus in the case of the embodiment illustrated in FIG. 3, the transmission of the rotation of the shafts 28 and 32 to respectively produce the rotation of the nozzle and of the nozzle-adjusting ring 28 may be effected by belt-and-pulley or chain-and-sprocket drives if desired.

What we claim is:

1. Apparatus for the transmission of movement from the rotary output element of a unit actuator forming part of a six structure to a unit-driven mechanism mounted on a carrier of at least one vectorised-thrust nozzle for use in an aircraft, having means for adjustably swivelling said nozzle about the swivel axles relative to the fixed structure to vary the thrust angle of the nozzle, and means for nozzle-area control operatively connected to the unit-drive mechanism for operation by said mechanism to vary the effective area of the nozzle, which apparatus comprises a flexible drive shaft operatively connected to the unit drive of said vectorised-thrust nozzle carrier, and means operatively connecting the output element of such unit actuator to said flexible drive shaft so as to rotate said shaft relative to the unit drive mechanism of said vectorised-thrust nozzle carrier by an amount proportional to the rotation of the output element of said unit actuator at a rate of rotation relative to the vectorised-thrust nozzle carrier which is unaffected by any rotation of the vectorised-thrust nozzle carrier relative to the fixed structure.

2. Apparatus as claimed in claim 1, wherein the means for transmitting the movement of the rotary output element of the unit actuator to the rotary input element of the unit-drive mechanism of the vectorised-thrust nozzle carrier include a shaft which, at its point of engagement with the vectorised-thrust nozzle carrier, extends axially of the carrier and is differentially coupled in such a manner to the respective outputs of the unit-drive actuator and of said means for adjustably swivelling said nozzle that, in addition to the rotation imparted to the said shaft by the unit-drive actuator for products the desired movement of the unit in relation to the vectorised-thrust nozzle carrier, additional rotation is imparted to it which is proportional to the output of said means for adjustably swivelling said nozzle so as to neutralize any rotary movement of the said shaft relative to the vectorised-thrust nozzle carrier which is due to rotation of the vectorised-thrust nozzle carrier itself.

3. Apparatus as claimed in claim 1, wherein the the vectorised-thrust nozzle carrier is provided with first guide means for the flexible shaft, and the fixed structure is provided with second guide means arranged to guide a portion of the flexible shaft between its connection to said unit drive of said vectorised-thrust nozzle and its point of entry into the said first guide means, the first and second guide means being so arranged that the portion of the flexible shaft extending between said first and second guide means enters each of said guide means in a direction perpendicular to the swivel axis of the vectorised-thrust nozzle carrier.

4. Apparatus as claimed in claim 1, wherein said output means of said unit actuator comprises a gear means having an axial bore through which said flexible shaft is arranged, said axial bore and said flexible shaft being formed to permit longitudinal sliding motion therebetween and to prevent rotary motion therebetween, thereby to take up the variations in the distances between the respective points of connection of the flexible shaft through the vectorised thrust nozzle carrier and through the output element of the unit actuator.

5. Apparatus as claimed in claim 3, wherein the guide means are arranged to ensure that the flexible shaft enters the vectorised-thrust nozzle carrier in a tangential direction.

6. Apparatus as claimed in claim 5, wherein the flexible shaft is so arranged that rotation of the vectorised-thrust nozzle carrier about its axis causes the adjacent portion of the flexible shaft to be wrapped round, or unwrapped from, part of the circumference of the vectorised-thrust nozzle carrier.

7. Apparatus as claimed in claim 6, with a unit actuator intended to drive corresponding units in two vectorised-thrust nozzle carriers for simultaneous rotation about equal angles wherein the flexible shafts for respective connection to the unit-drive mechanism in each of the two vectorised-thrust nozzle carriers are arranged to be each wound on the respective vectorised-thrust nozzle carrier in such direction that, as one flexible shaft is wound on to its associated vectorised-thrust nozzle carrier, the other flexible shaft is unwound from its vectorised-thrust nozzle carrier by an equal amount, so that the sum of the utilized lengths of the flexible shafts remains constant.

8. Apparatus as claimed in claim 7, wherein a single flexible shaft is engaged in a longitudinally slidable manner by a drive member which itself is driven by the unit actuator and which interconnects the unit drives in the two vectorised-thrust nozzle carriers.

* * * * *